Patented Sept. 19, 1939

2,173,114

UNITED STATES PATENT OFFICE 2,173,114

PROCESS FOR THE DEHYDROGENATION OF SECONDARY HYDROXY COMPOUNDS AND PRODUCTS OBTAINED THEREFROM

Benjamin W. Howk, Wilmington, and Wilbur A. Lazier, New Castle County, Del., assignors to E. I. du Pont de Nemours & Company, Wilmington, Del., a corporation of Delaware No Drawing. Application December 24, 1935, Serial No. 56,084

21 Claims. (Cl. 260—488)

This invention relates to catalytic dehydrogenation processes and more particularly it relates to processes for the removal of hydrogen from secondary hydroxy compounds over ferrous metal catalysts. More specifically, this invention relates to processes for the liquid phase dehydrogenation of primary-secondary polyhydroxy compounds and their ethers and esters with nickel catalysts.

The dehydrogenation of polyalcohols, either partially or completely is not a new process. Lazier (U. S. 1,949,425) has disclosed the dehydrogenation of glycerol in the vapor phase over promoted chromite catalysts. German Patent 568,546 (1933) describes the conversion of 1,3-butylene glycol to 3-keto-butyl alcohol over a reduced $CuCO_3$-on-water glass catalyst in the vapor phase at reduced pressure. So far as we are aware, no disclosure has been made to the liquid phase dehydrogenation of primary-secondary polyhydroxy compounds or their ethers and esters over ferrous metal catalysts at atmospheric or super-atmospheric pressures. According to the present process, ferrous metal catalysts are employed to effect the removal of hydrogen from the secondary carbinol groups of compounds containing both free or combined primary carbinol groups and an uncombined secondary carbinol group. We have found this process to be operable in the liquid phase at moderately low temperatures when catalysts of suitable activity are employed.

This invention has an an object the catalytic dehydrogenation of the secondary carbinol groups of primary-second polyhydroxy compounds and their ethers or esters. A further object is to prepare two new compositions of matter, 12-ketostearyl acetate and 12-ketostearyl alcohol.

These objects are accomplished by means of the following invention which comprises heating, preferably with stirring, a suitable hydroxy compound in contact with a finely divided ferrous metal catalyst within the temperature range from 50° to 400° C., at pressures sufficient to overcome the vapor pressure of the compound. Under these conditions hydrogen is evolved and the reaction is allowed to continue until the amount of hydrogen given off corresponds to that theoretically required for conversion of the secondary carbinol groups to ketonic groups. The reaction is then stopped and the products separated. The preferred embodiments of this invention are given in detail in the following selected examples.

Example 1

One hundred and fifty grams of pure octadecanediol-1,12 and 400 cc. of pyridine are placed in a flask equipped with a stirring device, reflux condenser and dropping funnel. The mixture is heated to boiling and 53.5 grams of acetic anhydride is added slowly through the dropping funnel. When all of the latter has been added, the mixture is refluxed for one half hour to insure the completion of the reaction. The mixture is taken up in benzene and washed thoroughly with warm water to remove pyridine, acetic acid and unchanged acetic anhydride. The benzene is evaporated and the residue recrystallized from ligroin to give 105 grams of octadecanediol monoacetate, M. P. 54° to 56° C., which has the following structural formula:

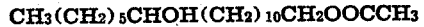
$CH_3(CH_2)_5CHOH(CH_2)_{10}CH_2OOCCH_3$

Seventy-five grams of the octadecanediol monoacetate and 7.5 grams of nickel-on-kieselguhr catalyst is charged into a flask and heated, preferably with stirring, through the temperature range from 200° to 230° C. over a period of 3.5 hours. During that time an amount of hydrogen is evolved equivalent to that theoretically required for conversion of the hydroxyl group to a carbonyl group. The product is dissolved in acetone, filtered to remove the catalyst and the solvent evaporated. The residue is crystallized from ligroin and 59 grams of ketostearyl acetate is obtained. This substance is a white, waxy solid, M. P. 38° to 41° C., and has the following structural formula:

$CH_3(CH_2)_5CO(CH_2)_{10}CH_2OOCCH_3$

Alakline hydrolysis of 12-ketostearyl acetate gives a practically quantitative yield of 12-ketostearyl alcohol having the following structure: $CH_3(CH_2)_5CO(CH_2)_{10}CH_2OH$. Analysis: Calcd. for $C_{18}H_{36}O_2$: C, 76.20; H, 12.68; hydroxyl No. 198. Found: C, 76.20; H, 12.88; hydroxyl No. 200.

Example 2

Two hundred grams of pure octadecanediol-1,12 together with 20 grams of nickel-on-kieselguhr catalyst is charged into a flask equipped with an efficient stirring device. The mixture is heated between temperatures of 200° C. and 240° C. for approximately three hours whereupon an amount of hydrogen equivalent to that necessary for the conversion of the secondary carbinol group to a ketone group is evolved. The solidified product is dissolved in alcohol, filtered to remove the catalyst and the alcohol evaporated.

The residue is recrystallized from ligroin to give a good yield of 12-ketostearyl alcohol, M. P. 71° to 72° C., which is identical with the ketostearyl alcohol described in Example 1.

*Example 3*

One hundred and eighty-seven grams of alpha, gamma-diethylin, together with 20 grams of nickel-on-kieselguhr catalyst is charged into an autoclave which is capable of withstanding high temperatures and pressures and is equipped with a device for bleeding off hydrogen gas. The contents of the autoclave are heated and maintained at temperatures ranging from 247° to 251° C. and at a pressure of approximately 10 atmospheres. Under these conditions, hydrogen is evolved and an amount equivalent to that theoretically required for conversion of the hydroxyl group to a carbonyl group is obtained in 6.5 hours. The product is dissolved in acetone, filtered to remove the catalyst and the solvent evaporated. The oily residue is heated for 3 hours at 130° to 140° C. with a slight excess of phthalic anhydride and distilled under diminished pressure. The product, 1,3-diethoxyacetone, B. P. 66° C./8 mm., is obtained in a yield of 50 per cent.

*Example 4*

Two hundred and ten grams of 1,3-diacetin and 21 grams of nickel-on-kieselguhr catalyst are placed in a flask equipped with a stirring device. The mixture is heated slowly until a temperature of 190° C. is reached, whereupon the evolution of hydrogen gas begins. Heating is continued until the flow of gas ceases at a maximum temperature of 230° C. The product is dissolved in acetone, filtered and distilled. The distillate, which consists of a mixture of diacetin and the corresponding ketone, is heated for 3 hours at 135° to 140° C. with a slight excess of phthalic anhydride and the ketone is distilled directly from this mixture under diminished pressure, washed with dilute alkali and redistilled. The product, 1,3-dihydroxy-acetone diacetate, is a colorless liquid, B. P. 137° to 139° C./15 mm., and has the following formula:

$$CH_3COOCH_2COCH_2OOCCH_3$$

The conversion is 35 per cent.

*Example 5*

One hundred grams of 2-hydroxypropyl palmitate is charged into a flask and heated with 10 grams of nickel-on-kieselguhr catalyst through temperatures ranging from 185° C. to 250° C. at approximately atmospheric pressure. Hydrogen is readily given off and heating is continued until the amount evolved is equivalent to that theoretically required for conversion of the secondary hydroxyl group to a carbonyl group. The product is separated by the usual methods and is 2-ketopropyl palmitate, $$CH_3COCH_2OOC-(CH_2)_{14}CH_3$$

In a similar manner compounds, such as 3-hydroxybutyl stearate, 2-phenyl-2-hydroxyethyl acetate and other primary esters and ethers of propylene glycol are dehydrogenated to the corresponding ketonic derivatives.

Although in the above examples we have indicated certain definite conditions of temperature, pressure, amounts of materials, durations of reactions, etc., it is to be understood that these values may be varied somewhat within the scope of this invention. The conditions for each reaction are governed by the properties of the materials under treatment and the catalyst chosen. The processes of this invention are operable within the temperature range from 50° C. to 400° C. and at pressures below atmospheric to such pressures as are necessary to maintain the substance treated in the liquid phase.

In its broadest aspects, this invention comprises the employment, in liquid phase dehydrogenation, of metallic catalysts chosen from group VIII of the periodic table. These are best employed in a finely divided form which offers a maximum of catalytic surface. Highly efficient catalysts of this nature may be prepared in a number of different ways. For example, a finely divided, massive metal catalyst may be prepared by alloying the metal with a more active metal and dissolving the more active metal with a suitable selective solvent. Similar massive catalysts are obtained by reduction of the oxides, hydroxides, carbonates, oxalates, etc., of the chosen metal, in a stream of hydrogen or another reducing gas at temperatures ranging from 300° to 600° C. In the latter case, a desirable economy of material may be effected by precipitation of the oxide, hydroxide, carbonate, etc., on a suitable inert supporting medium such as pulverized pumice, kieselguhr and the like, prior to the reduction. In this way a large catalytic surface is maintained and the supporting medium replaces a considerable amount of the metal which is catalytically inactive in a massive catalyst. Among those hydrogenating metals which are particularly efficacious for the dehydrogenation of primary-secondary polyhydroxy compounds, nickel, cobalt, palladium, and platinum catalysts might be mentioned.

The compounds, suitable for dehydrogenation, which are within the scope of this invention are those which have the following type formula:

$$R-CHOH-(CHY)_x-CH_2OR'$$

in which R is a simple or substituted alkyl or aryl group, R' may be hydrogen, an alkyl radical, an aryl radical, or an acyl radical, $x$ may be zero or a finite number from one to twenty and Y may be hydrogen, a hydroxyl, alkyl or aryl radical.

The compounds suitable for use in this invention may also be defined as primary-secondary aliphatic alcohols and derivatives obtainable therefrom by etherification or esterification of the primary carbinol group.

Among the compounds to which the processes of this invention would be applicable, the following are mentioned: gycerol, propylene glycol, octadecanediol-1,12, 1-3-butylene glycol, phenyl ethylene glycol and their primary esters and ethers. The reaction which occurs when these compounds are dehydrogenated is exemplified by the following general equation:

$$R-CHOH(CHY)CH_2OR' \xrightarrow{\text{Catalyst}} R-\underset{\underset{O}{\|}}{C}-(CHY)CH_2OR'+H_2$$

A large number of the compounds which come within the scope of this invention are high boiling and comparatively unstable at high temperatures. It is apparent that our process of liquid phase dehydrogenation at relatively low temperatures offers great advantages in those cases since a vapor phase dehydrogenation process cannot be applied to compounds unstable at the operating temperatures of these prior art processes. Such factors as side reactions and inactivation of metallic catalysts through sintering likewise contribute to the difficulties in vapor phase catalytic dehydrogenation reactions in the case of compounds of this character. Furthermore, a large variety of valuable compounds which can otherwise be obtained only through costly and tedious processes, are capable of being produced economically by means of the process of this invention.

It has been mentioned previously that this invention is applicable, not only to the more volatile compounds, but to those excluded by physical and chemical properties from participating in vapor phase reactions. The compounds prepared by our process have a wide variety of uses as insecticides, intermediates in the formation of detergents, plasticizers in compositions containing cellulose ethers and esters, and as solvents and modifying agents for natural and synthetic gums, resins, rubber and rubber derivatives. They are also potentially useful as perfume chemicals, wax blending agents for moisture proofing compositions e. g., regenerated cellulose, and as components of cosmetic creams, wax emulsions and "dopes" for coating fabrics. Other uses will be apparent to a person skilled in the art.

Since many apparently widely different embodiments of this invention may be made without departing from the spirit and scope thereof, it is to be understood that we do not limit ourselves to the specific embodiments thereof, except as defined in the following appended claims.

We claim:

1. A dehydrogenation process for the conversion of secondary carbinol groups to ketonic groups which comprises contacting a compound of the general formula,

in which R is selected from the group consisting of simple and substituted alkyl and aryl radicals, R' is selected from the group consisting of hydrogen, an alkyl radical an aryl radical, and an acyl radical, and $x$ is a number from 0 to 20, inclusive, and Y is selected from the group consisting of hydrogen, a hydroxyl radical, an alkyl radical, and an aryl radical, in the liquid phase at a temperature between 50° C. and 400° C. with a metal of the eighth group of the periodic table.

2. A dehydrogenation process for the conversion of secondary carbinol groups to ketonic groups which comprises contacting a compound of the general formula,

in which R is selected from the group consisting of simple and substituted alkyl and aryl radicals, R' is selected from the group consisting of hydrogen, an alkyl radical, an aryl radical, and an acyl radical, and $x$ is a number from 0 to 20, inclusive, and Y is selected from the group consisting of hydrogen, a hydroxyl radical, an alkyl radical, and an aryl radical, in the liquid phase at a temperature of about 185° C. to 250° C. with a metal of the eighth group of the periodic table.

3. A dehydrogenation process for the conversion of secondary carbinol groups to ketonic groups which comprises contacting a compound of the general formula,

in which R is selected from the group consisting of simple and substituted alkyl and aryl radicals, R' is selected from the group consisting of hydrogen, an alkyl radical, an aryl radical, and an acyl radical, and $x$ is a number from 0 to 20, inclusive, and Y is selected from the group consisting of hydrogen, a hydroxyl radical, an alkyl radical, and an aryl radical, in the liquid phase at a temperature between 50° C. and 400° with a ferrous metal of the group consisting of iron, nickel and cobalt.

4. A dehydrogenation process for the conversion of secondary carbinol groups to ketonic groups which comprises contacting a compound of the general formula,

in which R is selected from the group consisting of simple and substituted alkyl and aryl radicals, R' is selected from the group consisting of hydrogen, an alkyl radical, an aryl radical, and an acyl radical, and $x$ is a number from 0 to 20, inclusive, and Y is selected from the group consisting of hydrogen, a hydroxyl radical, an alkyl radical, and an aryl radical, in the liquid phase at a temperature between 50° C. and 400° C. with a nickel catalyst.

5. A dehydrogenation process for the conversion of secondary carbinol groups to ketonic groups which comprises contacting a compound of the general formula,

in which R is selected from the group consisting of simple and substituted alkyl and aryl radicals, R' is selected from the group consisting of hydrogen, an alkyl radical, an aryl radical, and an acyl radical, and $x$ is a number from 0 to 20, inclusive, and Y is selected from the group consisting of hydrogen, a hydroxyl radical, an alkyl radical, and an aryl radical, in the liquid phase at a temperature between 50° C. and 400° C. with a nickel-on-kieselghur catalyst.

6. A dehydrogenation process for the conversion of secondary carbinol groups to ketonic groups which comprises contacting a compound of the general formula,

in which R is selected from the group consisting of simple and substituted alkyl and aryl radicals, R' is selected from the group consisting of hydrogen, an alkyl radical, an aryl radical, and an acyl radical, and $x$ is a number from 0 to 20, inclusive, and Y is selected from the group consisting of hydrogen, a hydroxyl radical, an alkyl radical, and an aryl radical, in the liquid phase at a temperature within the range of 50° C. to 400° C. and at a pressure from below atmospheric up to such a pressure that is necessary to maintain the reaction in the liquid phase with a metal of the eighth group of the periodic table.

7. A dehydrogenation process for the conversion of the secondary carbinol group in 1,12 octadecanediol 1-acetate to a ketonic group which comprises contacting 1,12 octadecanediol 1-acetate in the liquid phase at a temperature within the range of 50° C. to 400° C. with a metal of the eighth group of the periodic table.

8. A dehydrogenation process for the conversion of the secondary carbinol group in 1,12 octadecanediol 1-acetate to a ketonic group which comprises contacting 1,12 octadecanediol 1-acetate in the liquid phase at a temperature within the range of 50° C. to 400° C. with a ferrous metal of the group consisting of iron, nickel and cobalt.

9. A dehydrogenation process for the conversion of the secondary carbinol group in 1,12 octadecanediol 1-acetate to a ketonic group which comprises contacting 1,12 octadecanediol 1-acetate in the liquid phase at a temperature within the range of 50° C. to 400° C. with a nickel catalyst.

10. A dehydrogenation process for the conversion of the secondary carbinol group in 1,12 octadecanediol 1-acetate to a ketonic group which comprises contacting 1,12 octadecanediol 1-acetate in the liquid phase at a temperature within the range of 50° C. to 400° C. with a nickel-on-kieselguhr catalyst.

11. A dehydrogenation process for the conversion of the secondary carbinol group in 1,12 octadecanediol 1-acetate to a ketonic group which comprises contacting 1,12 octadecanediol 1-acetate in the liquid phase at a temperature of about 200° C. to about 230° C. with a metal of the eighth group of the periodic table.

12. A dehydrogenation process for the conversion of the secondary carbinol group in 1,12 octadecanediol 1-acetate to a ketonic group which comprises contacting 1,12 octadecanediol 1-acetate in the liquid phase at a temperature of about 200° C. to 230° C. with a nickel-on-kieselguhr catalyst for a period of about 3.5 hours and removing the ketostearyl acetate so formed.

13. A dehydrogenation process for the conversion of the secondary carbinol group in 1,12-octadecanediol to a ketonic group which comprises contacting 1,12-octadeconediol in the liquid phase at a temperature of about 200° C. to about 240° C. with a nickel-on-kieselguhr catalyst and removing the 12-ketostearyl alcohol formed.

14. A dehydrogenation process for the conversion of the secondary hydroxyl group in α,γ-diethylin to a ketonic group which comprises contacting α,γ-diethylin, under sufficient pressure to maintain it in the liquid phase at a temperature of 247° C. to 251° C. with a nickel-on-kieselguhr catalyst and removing the 1,3-diethoxy acetone which is formed.

15. A catalytic dehydrogenation process which comprises heating a compound taken from the class which consists of primary-secondary aliphatic alcohols and ethers and esters of said primary-secondary aliphatic alcohols containing three secondary alcohol groups to a temperature between 50° C. and 400° C. and under a pressure sufficient to maintain a liquid phase, and in contact with a finely divided ferrous metal of the group consisting of iron, nickel and cobalt.

16. The process of claim 15 characterized in that the compound dehydrogenated is a primary-secondary aliphatic alcohol.

17. The process of claim 15 characterized in that the compound dehydrogenated is an ether.

18. The process of claim 15 characterized in that the compound dehydrogenated is an ester.

19. As a new compound 12-ketostearyl acetate which has the formula

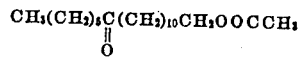

20. As a new compound 12-ketostearyl alcohol which has the formula

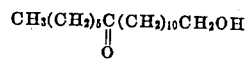

and has a melting point of 71° to 72° C.

21. The process which comprises heating under reflux conditions octadecanediol-1,12 and pyridine while slowly adding acetic anhydride to the boiling mixture, extracting and recovering octadecanediol mono acetate from the reaction mass, contacting the octadecanediol mono acetate in the liquid phase at a temperature of about 200° to 230° C. with a nickel-on-kieselguhr catalyst for a period of about three and one-half hours, and recovering the keto stearyl acetate that is formed.

BENJAMIN W. HOWK,
WILBUR A. LAZIER.